United States Patent [19]

Klaren

[11] Patent Number: 5,676,201
[45] Date of Patent: Oct. 14, 1997

[54] APPARATUS FOR CARRYING OUT A PHYSICAL AND/OR CHEMICAL PROCESS, SUCH AS A HEAT EXCHANGER

[75] Inventor: Dick Gerritt Klaren, Hillegom, Netherlands

[73] Assignee: Bronswerk Heat Transfer B.V., Nijkerk, Netherlands

[21] Appl. No.: 549,837

[22] PCT Filed: Apr. 19, 1994

[86] PCT No.: PCT/NL94/00082

§ 371 Date: Jan. 30, 1996

§ 102(e) Date: Jan. 30, 1996

[87] PCT Pub. No.: WO94/24508

PCT Pub. Date: Oct. 27, 1994

[30] Foreign Application Priority Data

Apr. 20, 1993 [DK] Denmark .................. 9300666

[51] Int. Cl.$^6$ .................................. F28D 13/00
[52] U.S. Cl. .................... 165/95; 165/104.16; 422/143; 422/146
[58] Field of Search ................... 165/95, 104.16; 422/143, 146

[56] References Cited

U.S. PATENT DOCUMENTS

| | | | |
|---|---|---|---|
| 4,398,594 | 8/1983 | Klaren | 165/104.16 |
| 4,426,958 | 1/1984 | Hosek et al. | 122/4 |
| 4,554,963 | 11/1985 | Goodwin et al. | 165/1 |
| 5,033,413 | 7/1991 | Zenz et al. | 122/4 D |

FOREIGN PATENT DOCUMENTS

| | | | |
|---|---|---|---|
| 0 278 262 | 8/1988 | European Pat. Off. | |
| 2152401 | 4/1972 | Germany | 165/104.16 |
| 2087534 | 5/1982 | United Kingdom | |

*Primary Examiner*—Allen J. Flanigan
*Attorney, Agent, or Firm*—Merchant, Gould, Smith, Edell, Welter & Schmidt, P.A.

[57] ABSTRACT

An apparatus for carrying out a physical and/or chemical process, such as a heat exchanger, comprising a reservoir (1) provided with upwardly-directed tubes (2), in which reservoir (1) a fluidized bed is present consisting of granular material and maintained by medium to be treated. The invention is provided with means for causing fluidized bed particles to circulate from a bottom box (3) of the reservoir (1) through the riser pipes (2), a top box (4) and a downcomer (15) back again to the bottom box (4), and with a closable bypass line (27) for feeding a portion of the fed medium to the riser pipes (2) while shortcutting the fluidized bed.

2 Claims, 3 Drawing Sheets

APPARATUS FOR CARRYING OUT A PHYSICAL AND/OR CHEMICAL PROCESS, SUCH AS A HEAT EXCHANGER

The invention relates to an apparatus for carrying out a physical and/or chemical process, such as a heat exchanger, comprising a reservoir provided with upwardly-directed tubes accommodated, at the top and bottom ends thereof, in tube plates, and which are in open communication with a top box and a bottom box, in which bottom box at least one distribution plate is arranged for supporting a fluidized bed consisting of granular material, capable of being held in a quasi-stationary, fluidized condition by means of a medium to be treated or heated, supplied via a feed line, which medium can flow, via the tubes provided in and above the fluidized bed with openings, to the top box while entraining fluidized bed particles, and which apparatus further comprises means for feeding fluidized bed particles back from the top box to the bottom box.

Such an apparatus is disclosed in GB-A-2 087 534. In this known apparatus, the internal circulation of fluidized bed particles serves for cleaning the inner surfaces of the riser pipes, which, in the case where a strongly polluted medium is treated or heated, may undergo a strong pollution.

Although this known apparatus is highly satisfactory in a large number of cases, drawbacks can be indicated which need to be removed. For a proper distribution of fluid and fluidized bed particles over the riser pipes, a reasonably heavy particle bed, i.e. a fluidized bed having a porosity of approximately 65%, is desirable. When the volume flow in the feed line increases, it is possible that the medium rate above the distribution plates becomes too high, as a consequence of which all particles of the fluidized bed would be blown away from the bottom box. These problems may be prevented by enlarging or expanding the apparatus, but this involves a considerable increase in costs. This is in particular disadvantageous in the case of a fluctuating medium flow, because this sometimes requires additional capacity and sometimes does not. If additional capacity is not required but nevertheless present, this may moreover lead to an a fluidized bed which is insufficiently fluidized and to an irregular distribution of the entrained fluidized bed particles over the riser pipes.

The object of the invention is to provide an apparatus of the type described hereinabove, wherein the drawbacks mentioned have been overcome. According to the invention, this object is realized through the presence of a bypass line having an adjustable flow rarer the arrangement being such that a portion of the medium fed via the feed line can directly be brought above the fluidized bed and flow into the tubes via the openings located above the fluidized bed.

In this manner, an apparatus is obtained wherein the amount of medium fed to the fluidized bed optionally be reduced by causing a portion of the flow to pass the fluidized bed via the bypass line, i.e., relatively large amounts of medium can be processed without involving the danger of a fluidized bed being blown away. Further, it will be understood that as an additional advantage, these features involve the possibility of an optimally functioning fluidized bed by keeping the amount of medium which is conducted through the fluidized bed more or less constant. It is observed that this solution of the above-described problems is based on the inventive insight that the fluidized bed particles should act on the walls of the riser pipes rather than on the medium, while it has further been proved that a reduction of the number of fluidized bed particles per medium unit which is fed through annuls the desired cleaning effect.

Further elaborated embodiments of the apparatus according to the invention relating to an external and an internal bypass line have been laid down in the subclaims.

Embodiments of the apparatus according to the invention are further explained with reference to the accompanying drawings. In these drawings.

Figure 1:
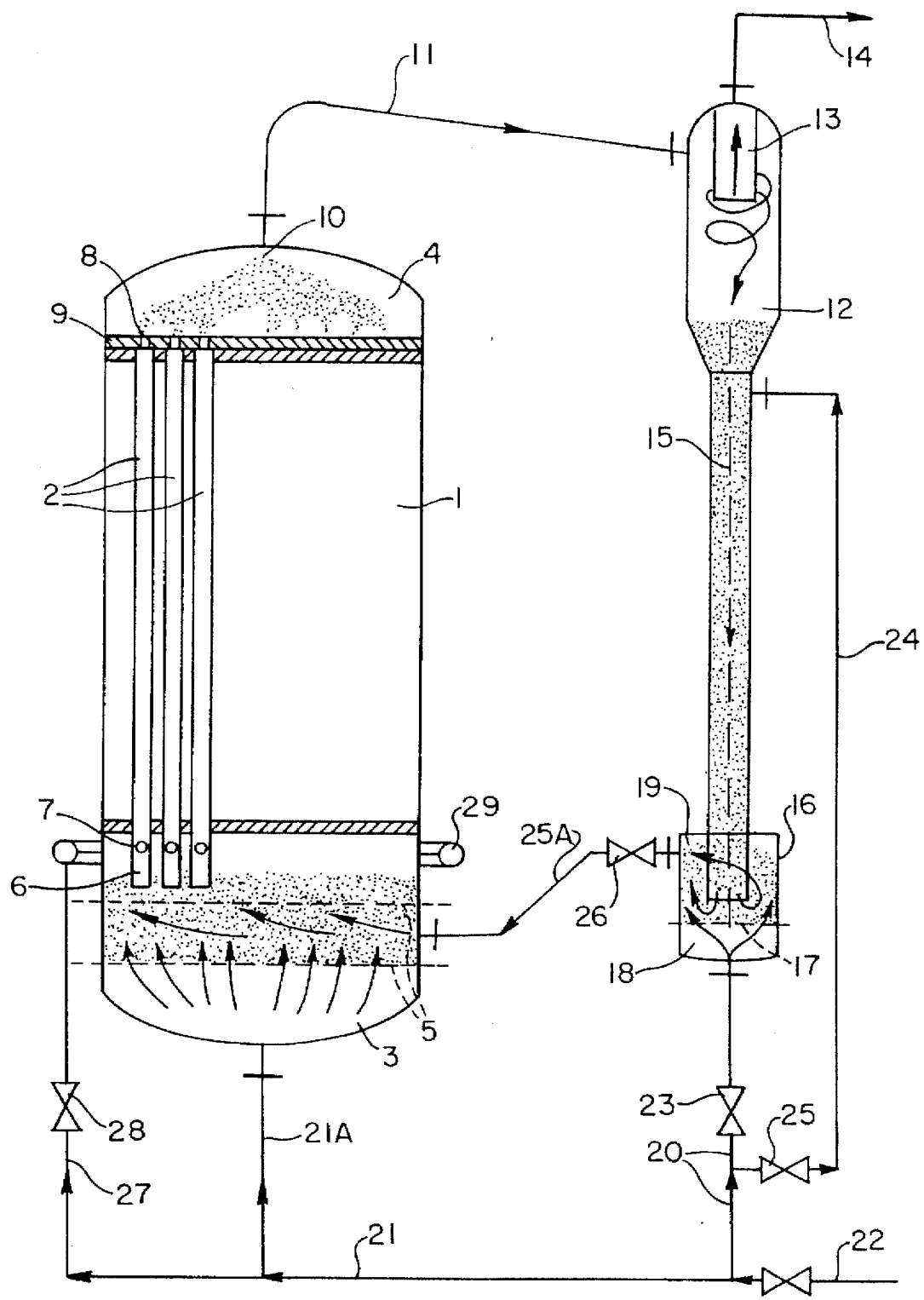
FIG. 1 shows a heat exchanger with external circulation of fluidized bed particles.

FIG. 1 shows a heat exchanger consisting of a reservoir 1, wherein a series of riser pipes 2 are arranged, accommodated, at the top and bottom ends thereof, in pipe plates. Above the top pipe plate, a top box 4 is located, into which the riser pipes 2 open, while under the bottom pipe plate a bottom box 3 is present, wherein one or more distribution plates 5 are arranged for supporting a fluidized bed consisting of granular material. At the bottom ends, the riser pipes 2 comprise an inlet piece 6, wherein openings 7 are provided. On top of or at a short distance from the top pipe plate, a throttling plate 9 is arranged, provided with openings 8, which openings are in register with the openings of the riser pipes 2 but have a smaller diameter than the internal diameter of the riser pipes 2. Located in the top box 4 is an outlet opening 10, to which an outlet line 11 is connected, while the medium to be treated or heated is fed to the bottom box 3 via a conduit 21, 21A. Of course, between the top and bottom pipe plate, the reservoir 1 comprises an inlet stub and an outlet stub for respectively feeding and discharging the heating medium to and from the heat exchanger. The heat exchanger can, of course, also be used as a cooling apparatus. The reservoir 1 as described hereinabove corresponds to the known apparatus according to EP-B-0.065.333, while the downcomers of the known apparatus have been omitted.

The external recirculation system for fluidized bed particles and fluid consists of a separating device 12 connected to the outlet line 11. Arranged at the bottom end of the separating device 12 is a downcomer 15 whose bottom end opens into a collecting reservoir 16, divided, by means of a distribution plate 17, into a bottom section 18 and a top section 19. The bottom section 18 is connected, by means of a conduit 20, to the feed line 22 for the medium to be treated or heated. In the conduit 20, a stop valve 23 is arranged. Via one or more conduits 25A, the top section 19 of the collecting reservoir 16 is connected to the bottom box 3 of the reservoir 1 for feeding fluidized bed particles from the collecting reservoir 16 back thereto. In each conduit 25A, a stop valve 26 is arranged. The feed line 22 is further connected to the bottom box 3 of the reservoir 1 by means of the conduit 21, 21A.

Located within the separating device 12 is a pipe 13 connected to a discharge line 14 for discharging the medium heated by the heat exchanger 1. A portion of this medium, together with recirculated fluidized bed particles, ends up in the downcomer 15.

Parallel to the downcomer 15, a bypass line 24 is arranged comprising a stop valve 25. The conduit 24 connects the bottom end of the separating device 12 to the feed line 20.

Operating the Apparatus According to the Invention

In the case of switched-on, external recirculation—the stop valves 26, 23 are in the open position, the stop valve 25 in the conduit 24 is closed—the apparatus operates as follows:

The larger portion of the medium to be treated, fed via the feed line 22, ends up, via the conduit 21, 21A, in the inlet box 3 of the reservoir 1, under the bottom distribution plate 5. The medium fed flows through the fluidized bed resting on the bottom distribution plate, which fluidized bed is brought into a fluidized condition. In and through the fluidized bed, the medium fed is evenly distributed over the riser pipes 2, in which riser pipes fluidized bed particles are located as well. Via the constricted openings 8 in the throttling plate 9, the fluid, which has in the meantime been treated or heated, or cooled, ends up, together with fluidized bed particles which are discharged from the riser pipes 2, in the top box 4 and subsequently in the separating device 12 via the outlet opening 10 and the conduit 11, a portion of the treated fluid being suctioned out into the conduit 14 via the tube 13, while fluidized bed particles and a portion of the treated fluid end up, via the separating device 12, in the external downcomer 15 and are fed via this downcomer 15 to the top section 19 of the collecting reservoir 16. Via the line 20 and the opened stop valve 23, a portion of the main stream, fed via the conduit 22, ends up in the bottom section 18 and subsequently, via the distribution plate 17, in the top section 19. This portion of the main stream entrains the fluidized bed particles present in the top section 19, in the conduits 25A, via which conduits the thus recirculated particles end up in the fluidized bed present in the reservoir 1.

The relevant process parameters can be measured in a simple manner on the downcomer by means of known equipment. Important are the temperature of the downcomer 15, the volume flow within this downcomer and the pressure difference occurring therein.

Switching Off the Recirculation System

If it is desired that the external circulation of the fluidized bed particles is stopped, the stop valve 23 in the conduit 20 is closed, so that the main stream is fed to the bottom box 3 of the heat exchanger 1 via the conduit 21, 21A exclusively. The fluidized bed particles entrained in the riser pipes 2 by this main stream collect in the downcomer 15 and the collecting reservoir 16, from which they are now no longer discharged because the stop valve 23 is closed. In the top section 19 of the collecting reservoir 16 and the downcomer 15, a packed bed of fluidized bed particles is formed. In course of time, the circulation of fluidized bed particles stops. This process can be accelerated by not only closing the stop valve 23, but also opening the stop valve 25, so that a portion of the main stream is fed via the conduit 24 to the bottom end of the separating device 12, as a consequence of which the fluidized bed particles in the separating device 12 are retained. If necessary, the stop valves 26 can be closed as well. In course of time, recirculation of the fluidized bed particles no longer takes place and the heat exchanger 1 functions as a "normal" heat exchanger, wherein the medium to be treated or heated is heated and dirt can deposit on the inner surface of the riser pipes, until, after a period fixed by experiment, the recirculation is switched on again.

If a switched-off recirculation apparatus is being employed for a longer period, a compression of fluidized bed particles will occur in the collecting reservoir 16 or the downcomer 15. The thus formed packed bed could possibly cause problems when the external recirculation system is switched on again. In order that this packed bed can be discharged more easily, a vibrating motor may be arranged on the downcomer 15. The downcomer 15 may also be made slightly divergent in the flow-through direction. Instead of making the downcomer itself divergent, a rod may be arranged in the cylindrical downcomer 15, which rod is slightly conical in the flow direction and can be vibrated by means of a motor. In this manner, in the case of a densely packed bed, the start of the circulation apparatus can be facilitated.

Limitation of the Flow Rates In or Through the Fluidized Bed

For a proper distribution of fluid and fluidized bed particles over the riser pipes 2, it is desirable to have a reasonably heavy particle bed, i.e. a fluidized bed having a porosity of approximately 65%. When a volume flow in the conduits 21, 21A increases, it is possible that the medium rate above the distribution plates 5 becomes too high, as a consequence of which all particles of the fluidized bed would be blown away from the bottom box 3. In order to maintain an active fluidized bed even in the case of great volume flows, a portion of the volume flow is preferably fed via a ring line 29, located at the height of the inlet pieces 6 of the riser pipes 2 and adapted to feed, via a series of connecting points, a portion of the fed volume flow to the top side of the inlet box 3 above the fluidized bed. Via a branch line 27 with a stop valve 28 arranged therein, the ring line 29 is connected to the main feed line 21, 22. In this manner, a much lower volume flow is fed to the inlet box 3, so that a well-fluidized bed can be maintained above the distribution plates 5 and, also, a lower entrance velocity of the medium in the inlet pieces 6 of the riser pipes 2 is obtained. The acceleration of the fluid in the riser pipes 2 now taxes place through the volume flow fed via the ring line 29, which is fed to the riser pipes 2 via the openings 7 in the inlet pieces 6.

It is observed that a bypass system 27, 28, 29 can be used with the same effect in heat exchangers having internal circulation of fluidized bed particles, such as described in EP-B-0.0650.333.

Figure 3:
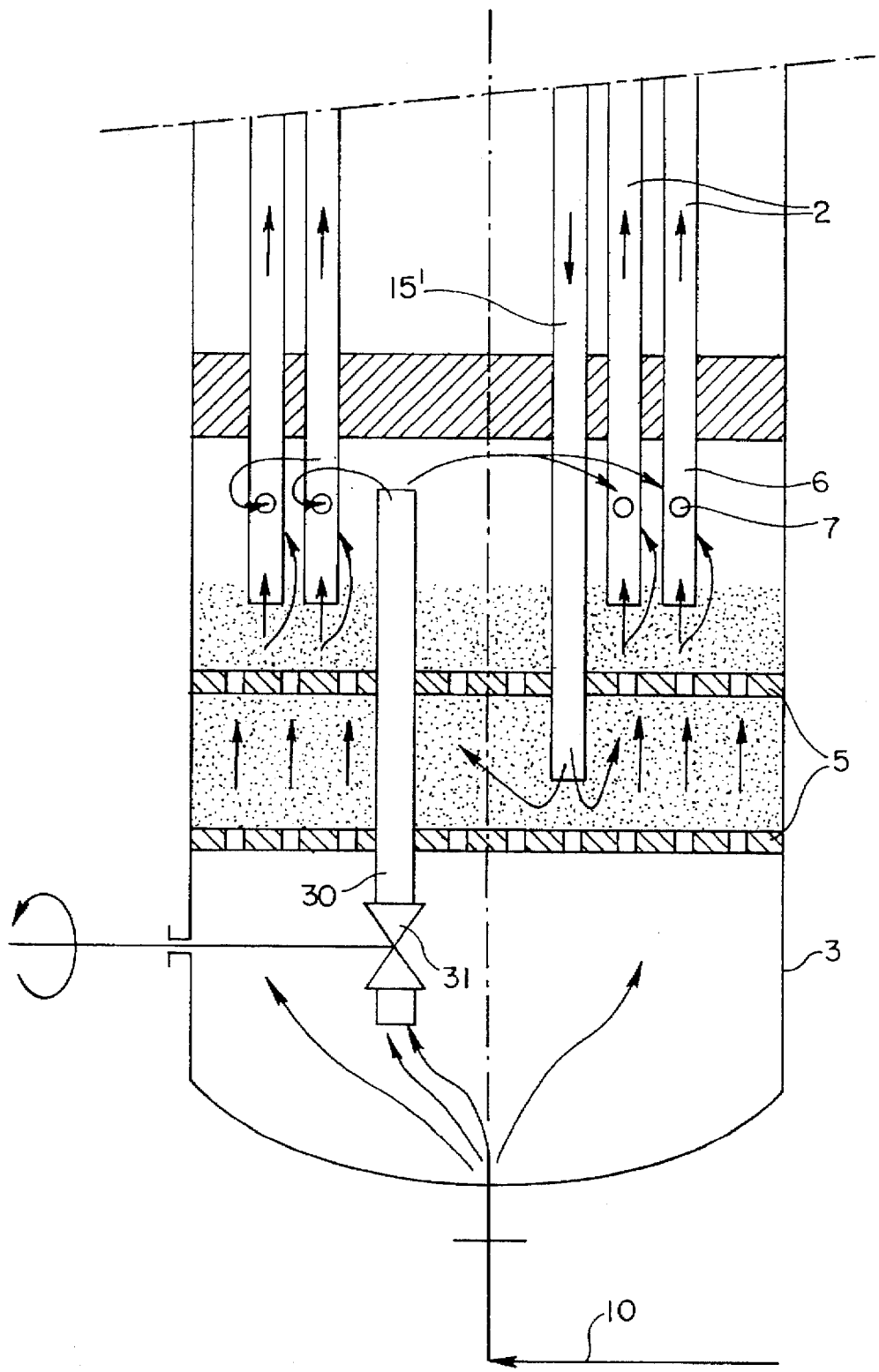
FIG. 3 shows a heat exchanger with internal circulation of fluidized bed particles and means for limiting the flow rate through the fluidized bed.

A variant of this bypass system is shown in FIG. 3. Arranged within the reservoir 1 with riser pipes 2 is a downcomer 15' for the internal circulation of fluidized bed particles. In the fluidized bed, an internal bypass tube 30 is present, having an externally operable regulating valve 31, which bypass tube 30 ends, at the top end thereof, above the fluidized bed and at the bottom end thereof in the bottom box 3, under the bottom distribution plate 5. In this manner, an adjustable portion of the volume flow of the medium to be treated, fed via the feed line 20, is not passed through the fluidized bed but fed directly, via the bypass line 30, from the bottom box 3 to the inlet pieces 6 of the riser pipes 2.

Figure 2:
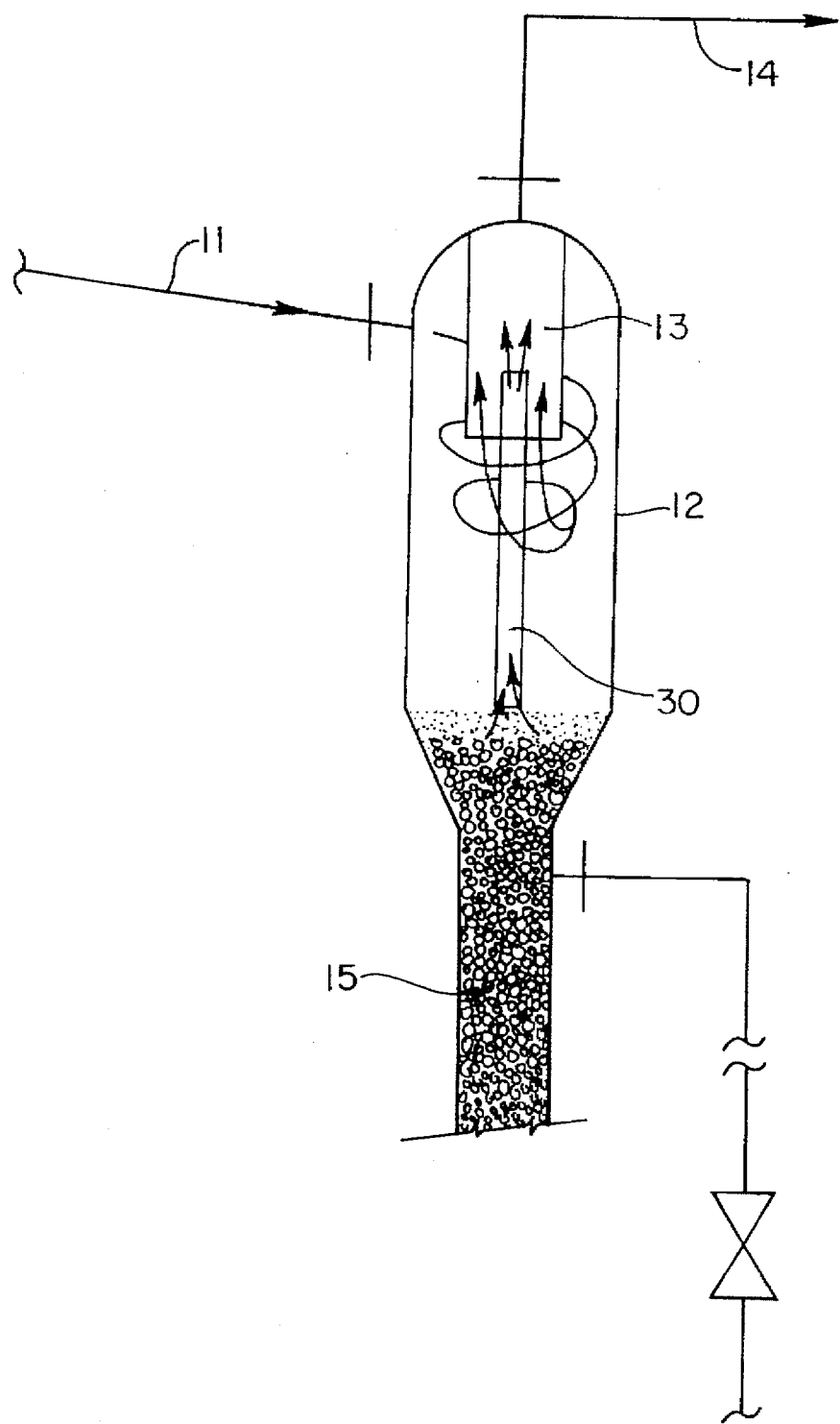
FIG. 2 shows a detail of the separating device, used in the apparatus according to FIG. 1.

When the circulation process in the downcomer 15 is switched off, impurities, for instance crystals from the fluid or dirt deposits removed from the riser pipes 2, may collect on the packed bed present therein, which will usually extend into the separating device 12. It is desired that these impurities are removed as much as possible, also during inactive circulation in the downcomer 15. A possibility for this is shown in FIG. 2. The packed bed present in the downcomer 15 extends into the separating device and located on top of this heavy, packed bed is a layer of impurities. In order to separate this lighter layer from the heavy bed, the stop valve 25 in the conduit 24 can be opened, as a result of which an upward flow takes place through the packed bed formed in the separating device 12. As a result of this flow, the relatively light impurities are "washed" from the heavy, packed bed material, or a classification takes place to the effect that the lighter dirt remains sitting on top of the heavy, packed bed material. The buildup of this layer of dirt can be limited by arranging a suction tube 30 within the separating device 12, to which suction tube 30, preferably, a small pump is connected. If desired, this dirt can also be discharged utilizing the pressure difference occurring in the separating device 12.

I claim:

1. A heat exchanger, for treating a medium comprising;

a reservoir provided with upwardly-directed tubes accommodated, at top and bottom ends thereof, in tube plates, the tubes in open communication with a top box and a bottom box at respective top and bottom ends;

at least one distribution plate being arranged in said bottom box for supporting a fluidized bed of granular material maintainable in a quasi-stationary, fluidized condition by the medium to be treated, the medium supplied by a feed line through the tubes, to the top box while entraining fluidized bed particles;

means for feeding fluidized bed particles back from the top box to the bottom box; and a bypass like having an adjustable flow rate connected to feed a portion of the medium fed from a feed line to directly above the fluidized bed and into the tubes through the openings located above the fluidized bed, the feed line dividing into a first line opening into the bottom box under the bottom distribution plate and into a closable bypass line connected to a ring line surrounding the bottom box of the reservoir and adapted to feed, through a series of connecting points, a portion of the medium to be treated to a top side of the inlet box above the fluidized bed.

2. A heat exchanger, for treating a medium comprising:

a reservoir provided with upwardly-directed tubes accommodated, at top and bottom ends thereof, in tube plates, the tubes in open communication with a top box and a bottom box at respective top and bottom ends;

at least one distribution plate being arranged in said bottom box for supporting a fluidized bed of granular material maintainable in a quasi-stationary, fluidized condition by the medium to be treated, the medium supplied by a feed line through the tubes, to the top box while entraining fluidized bed particles;

means for feeding fluidized bed particles back from the top box to the bottom box; and a bypass line having an adjustable flow rate connected to feed a portion of the medium fed from a feed line to directly above the fluidized bed and into the tubes through the openings located above the fluidized bed, the internal bypass line connected within the reservoir so as to have an externally operable regulating valve, the bypass line having an open mouth at a top end located above the fluidized bed, while an open mouth at a bottom end is located in the bottom box under the bottom distribution plate.

* * * * *

UNITED STATES PATENT AND TRADEMARK OFFICE
CERTIFICATE OF CORRECTION

PATENT NO. : 5,676,201
DATED : OCTOBER 14, 1997
INVENTOR(S) : KLAREN

It is certified that error appears in the above-identified patent and that said Letters Patent is hereby corrected as shown below:

Col. 1, line 48: "rarer" should read --rate,--

Col. 4, line 25: "taxes" should read --takes--

Col. 5, line 15, claim 1: "like" should read --line--

Signed and Sealed this

Seventeenth Day of August, 1999

Attest:

Q. TODD DICKINSON

Attesting Officer

Acting Commissioner of Patents and Trademarks